US008260553B2

(12) United States Patent
Klein et al.

(10) Patent No.: US 8,260,553 B2
(45) Date of Patent: Sep. 4, 2012

(54) METHODS, APPARATUSES, AND COMPUTER PROGRAM PRODUCTS FOR PROVIDING USER LOCATION INFORMATION

(75) Inventors: Michael Klein, Berlin (DE); Klaus Hartl, Berlin (DE); Andreas Follmann, Berlin (DE); Tilmann Singer, Vienna (AT); Sean Treadway, Berlin (DE); Jeanny Wang, Berlin (DE)

(73) Assignee: Nokia Corporation, Espoo (FI)

( * ) Notice: Subject to any disclaimer, the term of this patent is extended or adjusted under 35 U.S.C. 154(b) by 978 days.

(21) Appl. No.: 12/241,673

(22) Filed: Sep. 30, 2008

(65) Prior Publication Data

US 2010/0082247 A1    Apr. 1, 2010

(51) Int. Cl.
*G01C 21/00*    (2006.01)
(52) U.S. Cl. ......... 701/519; 701/424; 701/465; 701/521
(58) Field of Classification Search .................. 701/200, 701/201, 202, 204, 400, 410, 424, 428, 465, 701/519, 521, 527
See application file for complete search history.

(56) References Cited

U.S. PATENT DOCUMENTS

| 7,016,781 | B1 * | 3/2006 | Wolfson | 701/410 |
|---|---|---|---|---|
| 7,072,670 | B2 * | 7/2006 | Sato et al. | 455/456.1 |
| 7,085,649 | B2 * | 8/2006 | Baur et al. | 701/209 |
| 7,480,563 | B2 * | 1/2009 | Ichimura | 701/521 |
| 7,747,645 | B2 * | 6/2010 | Wahl | 707/783 |
| 7,761,228 | B2 * | 7/2010 | Ichimura | 701/519 |
| 7,860,517 | B1 * | 12/2010 | Patoskie et al. | 455/456.1 |
| 2004/0002813 | A1 | 1/2004 | Silvester | |
| 2008/0016442 | A1 * | 1/2008 | Khoo | 715/700 |
| 2008/0086261 | A1 | 4/2008 | Robinson et al. | |
| 2008/0132251 | A1 | 6/2008 | Altman et al. | |
| 2008/0288355 | A1 * | 11/2008 | Rosen | 705/14 |
| 2009/0168609 | A1 * | 7/2009 | Weir et al. | 368/21 |
| 2010/0305848 | A1 * | 12/2010 | Stallman | 701/204 |

FOREIGN PATENT DOCUMENTS

| JP | 2005024517 A | 1/2005 |
|---|---|---|
| WO | WO 2006/044939 A2 | 4/2006 |

OTHER PUBLICATIONS

The International Search Report for PCT Application No. PCT/FI2009/050689; Filed Sep. 1, 2009; Date of Completion Nov. 26, 2009; Date of Mailing Dec. 1, 2009.
The Written Opinion for PCT Application No. PCT/FI2009/050689; Filed Sep. 1, 2009; Date of Completion Nov. 26, 2009; Date of Mailing Dec. 1, 2009.

\* cited by examiner

*Primary Examiner* — Kaitlin Joerger
*Assistant Examiner* — Ernesto Suarez
(74) *Attorney, Agent, or Firm* — Alston & Bird LLP

(57) ABSTRACT

A method, apparatus, and computer program product are provided, which may provide activity user location information. An apparatus may include a processor configured to maintain data describing a first user's location timeline. The processor may be further configured to receive a request for the first user's current location. The first user's current location may define the first user's location at a current time. The processor may also be configured to estimate the first user's current location based at least in part upon the maintained data. The processor may additionally be configured to provide the first user's current location to a second user. Corresponding methods and computer program products are also provided.

20 Claims, 4 Drawing Sheets

METHODS, APPARATUSES, AND COMPUTER PROGRAM PRODUCTS FOR PROVIDING USER LOCATION INFORMATION

TECHNOLOGICAL FIELD

Embodiments of the present invention relate generally to mobile communication technology and, more particularly, relate to methods, apparatuses, and computer program products for providing user location information.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies as well as evolved computing devices making use of networking technologies continue to facilitate ease of information transfer and convenience to users. One area in which there is a demand to further improve the convenience to users is harnessing the connectivity and ready access to information available through expansion of networking technologies for the provision of user location information.

For example, modern computing technologies may facilitate management of, access to, and communication with a user's contacts. Additionally, existing networking and computing technologies may facilitate scheduling and viewing of activities, such as in a calendar application, by computing device users. Computing devices may also be configured to determine a current location of a user, such as through Global Positioning System (GPS) technology. Social networking services, such as Facebook™, MySpace™, and LinkedIn™, may facilitate interaction between a user and contacts. However, users currently lack a system for harnessing available information and integrating various services so as to provide users with a meaningful system for planning, creating, coordinating, and sharing activities with contacts. For example, a user may define an itinerary comprising locations at which the user plans to be at certain times. However, the itinerary may not define a location for the user at all times and it may not be feasible to determine the user's location, such as through sensory means, at any given time. In this regard, system limitations and/or limited battery power may prevent or limit the ability or desirability to determine a user's location at any given time. Thus, currently, there is a lack of ability to provide requesting contacts with information about a user's location at any given time. Accordingly, the ability of requesting contacts to coordinate or otherwise plan activities with the user may be limited.

Accordingly, it may be advantageous to provide computing device users with methods, apparatuses, and computer program products for providing user location information.

BRIEF SUMMARY OF SOME EXAMPLES OF THE INVENTION

A method, apparatus, and computer program product are therefore provided, which may provide user location information. In particular, a method, apparatus, and computer program product may be provided to enable, for example, a first user's current location to a second user. In an exemplary embodiment, the first user's current location may be estimated based at least in part upon a known previous location for the first user and a next known location for the first user. In some embodiments, users may be able to manage privacy settings and embodiments of the present invention may maintain individual user settings such that privacy settings may be enforced transparent to the application level.

In one exemplary embodiment, a method is provided which may include maintaining data describing a first user's location timeline. The method may further include receiving a request for the first user's current location. The first user's current location may define the first user's location at a current time. The method may also include estimating the first user's current location based at least in part upon the maintained data. The method may additionally include providing the first user's current location to a second user.

In another exemplary embodiment, a computer program product is provided. The computer program product includes at least one computer-readable storage medium having computer-readable program instructions stored therein. The computer-readable program instructions may include first, second, third, and fourth program instructions. The first program instruction is for maintaining data describing a first user's location timeline. The second program instruction is for receiving a request for the first user's current location. The first user's current location may define the first user's location at a current time. The third program instruction is for estimating the first user's current location based at least in part upon the maintained data. The fourth program instruction is for providing the first user's current location to a second user.

In another exemplary embodiment, an apparatus is provided, which may include a processor configured to maintain data describing a first user's location timeline. The processor may be further configured to receive a request for the first user's current location. The first user's current location may define the first user's location at a current time. The processor may also be configured to estimate the first user's current location based at least in part upon the maintained data. The processor may additionally be configured to provide the first user's current location to a second user.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
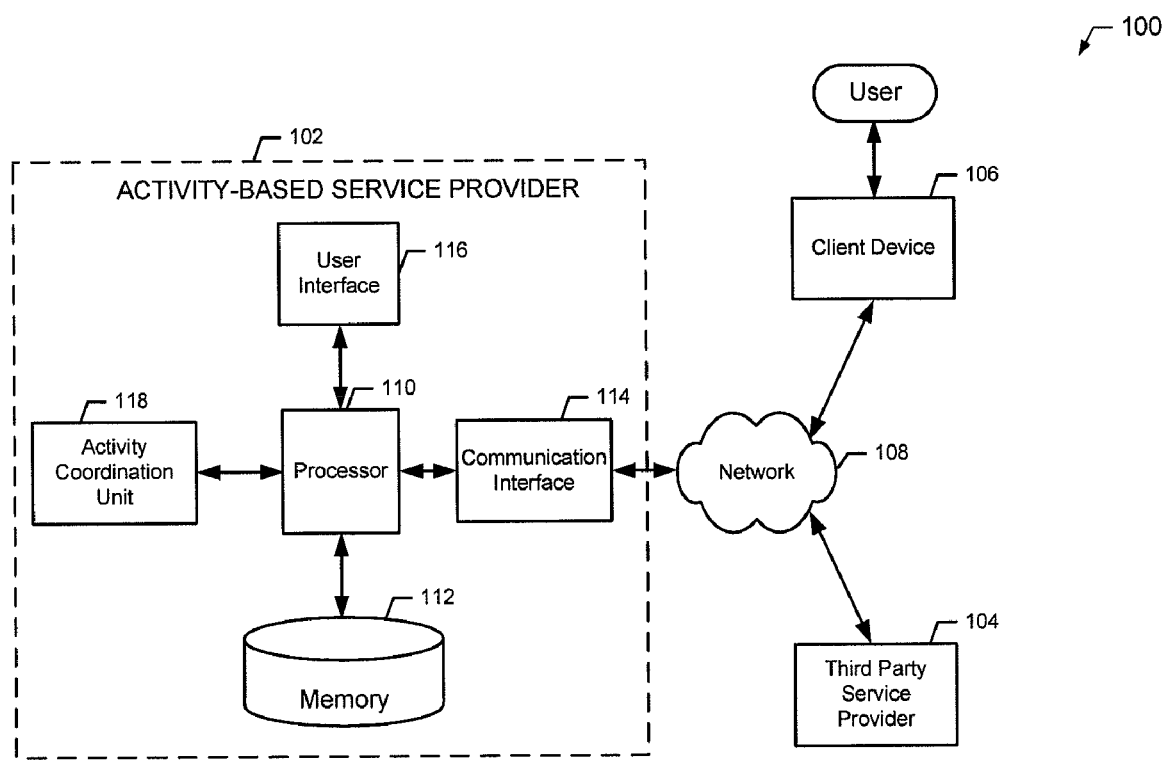
FIG. 1 illustrates a block diagram of a system for providing activity coordination services, including user location information, according to an exemplary embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a system 100 for providing activity coordination services, including user location information, according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system for providing activity coordination information, numerous other configurations may also be used to implement embodiments of the present invention.

As used herein, "activity" refers to a description of any event in which a user may participate. Such an activity may be, for example, a social event, sporting event, performing arts event, business meeting, personal appointment, and/or the like. In an exemplary embodiment, an activity may comprise one or more users participating in the activity, a place (e.g., location) at which the activity will occur, a time at which the activity will occur, an activity type (e.g., a social event, sporting event, performing arts event, business meeting, personal appointment, and/or the like), and/or the like. It will be appreciated that the place may comprise a real world location, a virtual world location, or some combination thereof. In an exemplary embodiment, an activity may be represented digitally as a shareable object that may be spread to contacts so as to inform them of an activity. In this regard, the activity may have a fixed uniform resource locator address associated with it such that users may reference the activity as an address that may be provided to contacts, such as via a message.

As used herein, a "contact" refers to a person with which a user may interact using an activity-based service provider and may be another user of an activity-based service provided by the activity-based service provider. In this regard, a user may invite a contact to participate in an activity. It will be appreciated that a "contact" as used herein need not be previously known to a user and may, but need not, be stored in an address book or friend list of a user of an activity-based service provider.

Referring now to FIG. 1, the system 100 may include an activity-based service provider 102, third party service provider 104, and client device 106 configured to communicate over a network 108. The activity-based service provider 102 may be embodied as any computing device or plurality of computing devices configured to provide activity-based services, such as those provided by Plazes.com, which will be described herein below, to users of remote devices, such as a client device 106, over the network 108. In an exemplary embodiment, the activity-based service provider 102 may be embodied as a server or plurality of servers, such as may comprise a server cluster or rack of blade servers. The third party service provider 104 may likewise be embodied as any computing device or plurality of computing devices and in an exemplary embodiment may be embodied as a server or plurality of servers. The third party service provider may be configured to provide any type of service (e.g., a navigation service, social networking service, multimedia service, internet search service, blog service, newsreader service, etc.) to users of remote computing devices, such as, for example users of a client device 106. The activity-based service provider 102 and third party service provider 104 may be further configured to communicate with each other so as to share service information in order to provide more robust and cohesive services to users. The client device 106 may be embodied as any computing device configured to communicate with an activity-based service provider 102 over the network 108 so as to create, manage and access activities. In some embodiments, the client device 106 may be embodied as a mobile computing device, such as, for example a mobile terminal 10 depicted in FIG. 2.

Figure 2:
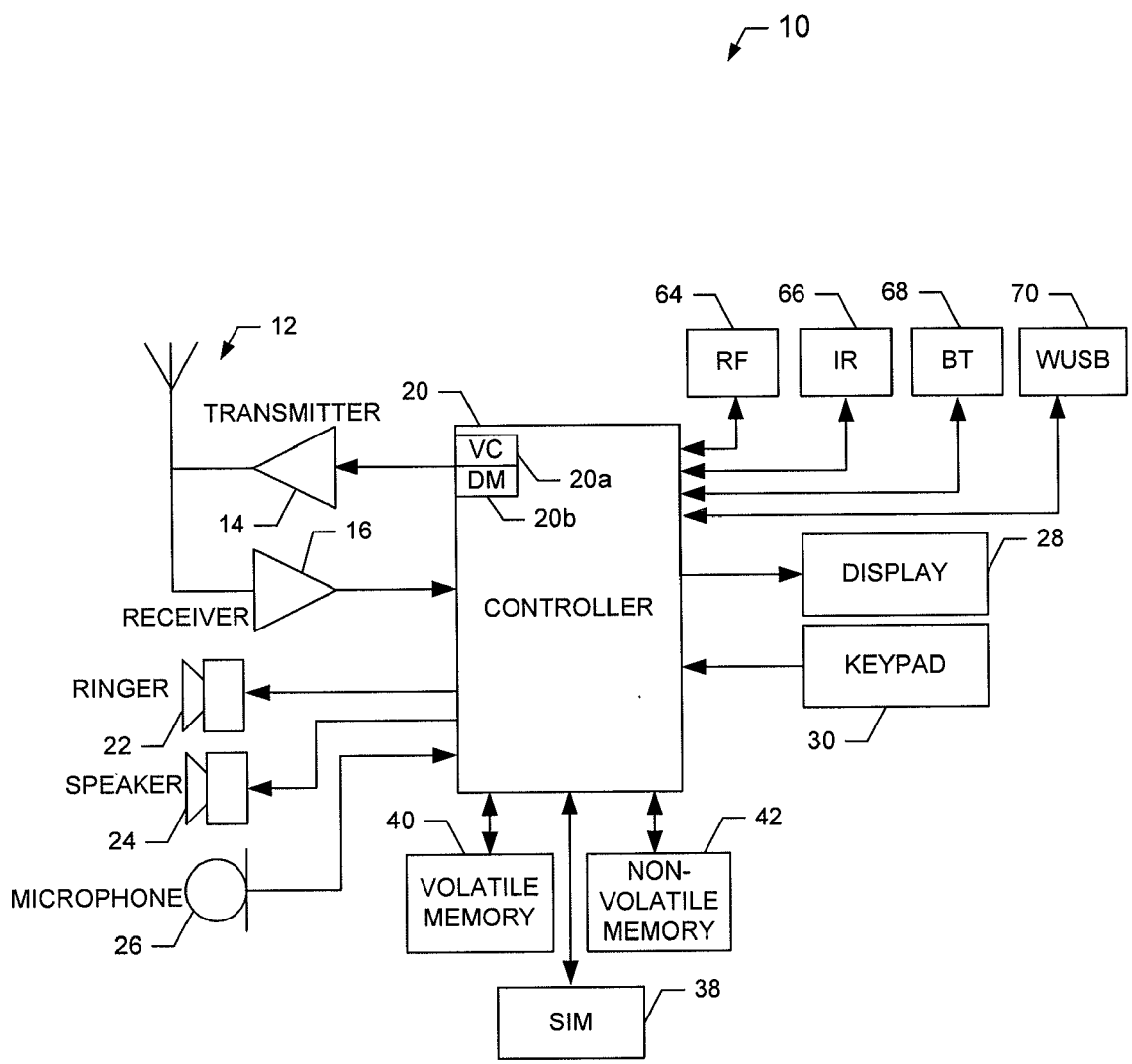
FIG. 2 is a schematic block diagram of a mobile terminal according to an exemplary embodiment of the present invention.

In this regard, FIG. 2 illustrates a block diagram of a mobile terminal 10 representative of one embodiment of a client device 106 in accordance with embodiments of the present invention. It should be understood, however, that the mobile terminal illustrated and hereinafter described is merely illustrative of one type of client device 106 that may benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireless networking techniques, comprising but not limited to Wireless-Fidelity (Wi-Fi), wireless local access network (WLAN) techniques such as Institute of Electrical and Electronics Engineers (IEEE) 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the controller 20. As used herein, "operationally coupled" may include any number or combination of intervening elements (including no intervening elements) such that operationally coupled connections may be direct or indirect and in some instances may merely encompass a functional relationship between components. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth transceiver 68 may be capable of operating according to ultra-low power Bluetooth technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, the client device 106 is not limited to being embodied as a mobile terminal 10 and may be embodied as any computing device, mobile or fixed, and accordingly may be embodied as a server, desktop computer, laptop computer, mobile terminal 10, and/or the like. The network 108 may comprise one or more wireless networks, wireline networks, cellular networks, or combination thereof. In an exemplary embodiment, the network 108 may be embodied as or comprise the internet. It will be appreciated that while FIG. 1 illustrates only a single third party service provider 104 and a single client device 106, the system 100 may comprise multiple third party service providers 104 and/or multiple client devices 106.

Figure 3:
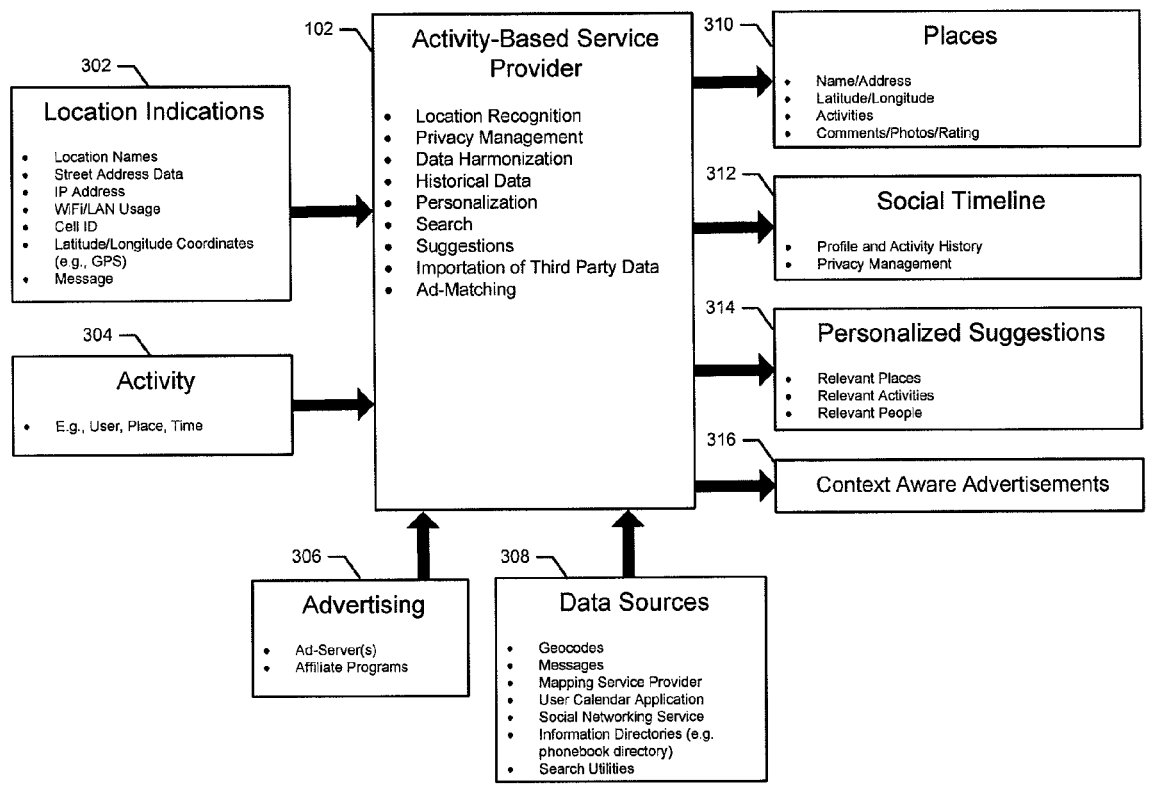
FIG. 3 is an information flow and processing diagram of information that may be received, processed, and sent by an activity-based service provider according to an exemplary embodiment of the present invention.

FIG. 3 illustrates a generalized information flow and processing diagram of data and information that may be received, processed, and sent by an activity-based service provider 102 according to an exemplary embodiment of the present invention. It will be appreciated, however, that FIG. 3 is merely for purposes of example and an activity-based service provider 102 may be configured to provide additional services as well as receive, process, and/or send information beyond that shown in FIG. 3. In this regard, an activity-based service provider 102 may be configured to receive various data, such as from a client device 106, third party service provider 104, and/or other device over the network 108. For example, the activity-based service provider 102 may be configured to receive one or more indications of a location of an activity. The location indications (box 302 of FIG. 3) may comprise an indication of a user's current location, such as may be determined from a current position of a client device 106 or may be an indication of a location at which a user will be in the future. Potential location indications may include a location name (e.g., Bob's house, Dave's office, and/or the like), street address data, an internet protocol address that may be correlated to a real world physical address or to a virtual world address, wireless access point usage (e.g. a local access network or the like) that may be correlated to a real world physical address or to a virtual world address, cell identification data identifying a cell from which a user's client device 106 is currently accessing a network, latitude and longitude coordinates such as may be determined by a global positioning system that may be embodied on a client device 106, a message (e.g. a short message service (SMS) message, multimedia messaging service (MMS) message, instant message (IM), e-mail, and/or the like) that may include a natural language indication of a location, and/or the like. Accordingly, the activity-based service provider 102 may be configured to recognize a location from the received location indication(s) and may be configured to associate the location with an activity.

The activity-based service provider 102 may further be configured to receive an activity (box 304 of FIG. 3), which may include associated information regarding time, place or location, user creating or hosting the activity, an activity type, any contacts participating or invited to the activity, and/or the like. The activity may be received, for example, from a client device 106, third party service provider 104, and/or other device over the network 108. A user of the client device 106 may enter the activity information via a user interface of the client device 106 and send the activity to the activity-based service provider. It will be appreciated that the activity-based service provider 102 may be configured to facilitate user entry and transmission of activity information over any number of interfaces, including, for example, a web page that may be loaded in a web browser, a dedicated application, and/or the like. Additionally or alternatively, the activity-based service provider 102 may be configured to receive activity data from a schedule management application, such as, for example, a calendar application, and/or from a third party service provider 104. The activity-based service provider may further be configured to provide sensory creation of activities. In this regard, the activity-based service provider may, for example, determine a user's location from one or more of the location indications above and create an activity associated with the user and the determined location. Sensory creation of activities may further comprise utilizing any data that may be received from a data source.

The activity-based service provider 102 may further be configured to receive data (box 308 of FIG. 3) that may be used by the activity-based service provider 102 to create activities, share activities, coordinate activities, as well as provide meaningful information to remote users about activities from a plurality of data sources. The data sources may comprise or may be embodied on any device accessible to the activity-based service provider 102 over the network 108 and may include, for example, a client device 106, third party service provider 104, cellular network devices that may provide cell ID information, as well as other devices. These data sources may include, for example, geocodes that may associate location data such as may be received as a location indication with a meaningful physical or virtual location, messages (e.g. a short message service (SMS) message, multimedia messaging service (MMS) message, instant message (IM), e-mail, and/or the like), a mapping service provider, a calendar application, a social networking service, an information directory (e.g., a phonebook directory), search utilities, and/or the like. These data sources may be embodied on a client device 106 and/or as a third party service provider 104.

The activity-based service provider 102 may be further configured to receive advertising data (box 306 of FIG. 3), such as from an advertising server, which may be embodied as a third party service provider 104. This advertising data may comprise various advertising content that the activity-based service provider 102 may be configured to match with activities or other user data when providing information to remote users such that users may receive requested information along with related advertising content. In this regard, the activity-based service provider 102 may provide targeted, context aware advertising (box 316 of FIG. 3) based at least in part upon information context. These context aware advertisements may be provided to a client device 106, third party service provider 104, or other device.

The activity-based service provider 102 may be configured to provide a plurality of activity-based services for users of devices such as a client device 106 using the received data and activity information. For example, the activity-based service provider 102 may be configured to provide location recognition such that a meaningful location can be determined from received location indications and associated with an activity. Further, the activity-based service provider 102 may be configured to associate a location with a "place." In this regard, a "place" may comprise location data, such as, for example, a street address or latitude and longitude coordinates, with context. This context may include information about the place, such as, for example, a name of a resident or property owner if the associated location is a residence (e.g., "Bill's House") or a business name if it is a business (e.g., "Nokia Headquarters"). Additionally or alternatively, the context information may include activities occurring at and/or scheduled to occur at the place. The context information may further include users that are currently located at the place, scheduled to be located at the place in the future (e.g., for an activity), and/or were previously located at the place (e.g., for an activity). The context information may additionally include user comments about the place, photographs of or related to the place, and/or user ratings of the place. In an exemplary embodiment, a place may be globally defined such that any user accessing information about a location or place may be directed to the associated place as well as associated context information. In this regard, a place may comprise an associated name such that users may identify the place by its name. A place may originally be defined by a user and/or may be defined by the activity-based service provider 102, such as based at least in part upon received activity data and/or location indications. Accordingly, a place may provide context to facilitate social interaction with respect to activities between users of the system 100.

In this regard, the activity-based service provider 102 may be configured to use available location, place, and/or context information to provide place and/or location data (box 310 of FIG. 3) to users of the system 100, such as by sending place data to devices of the system 100. These devices may include, for example, a client device 106, third party service provider 104, as well as other devices, where the place data may be viewed or otherwise accessed by a user. The place data may comprise a place name, address, longitude/latitude coordinates of the place, activities occurring at the place, user comments about the place, photographs of the place, and/or user ratings (e.g., popularity ratings) of the place.

The activity-based service provider 102 may additionally be configured to provide privacy management. In this regard, users may manage privacy settings with respect to how much information is shared with other users. Such information may comprise created activities, user profile information, activities in which the user is participating, historical activity data, places associated with the user, and/or the like. The activity-based service provider 102 may be configured to provide privacy management capabilities such that a user may define different privacy levels for different types of information and/or different groups of contacts (e.g., business contacts, personal contacts, unknown contacts, etc).

The activity-based service provider 102 may further be configured to provide data harmonization. Such data harmonization may include globally updating activity and place information across the system 100. Additionally or alternatively, data harmonization may comprise importing data from and/or exporting data to client devices 106 and/or third party service providers 104 such that data may be harmonized so as to be consistent across a plurality of services and/or applications that may be accessed from or reside on a plurality of devices of the system 100.

Additionally, the activity-based service provider 102 may be configured to aggregate historical data, such as data describing a user's history of activity participation, locations at which the user has been located, and/or the like. This historical data may be provided to the user and/or to contacts with permission to view the user's history, such as in the form of a social timeline (box 312 of FIG. 3). Also, this historical data as well as any associated user profile information, such as personal preferences, may be used by the activity-based service provider 102 to personalize activity-based services provided to the user. This personalization may include personalized suggestions (box 314 of FIG. 3) of relevant places, activities, and/or contacts in which the user may be interested. In an exemplary embodiment, the activity-based service provider may be further configured to provide a search service to users. In this regard, users of remote computing devices, such as a client device 106, may be able to search data stored or accessible by the activity-based service provider 102 for information regarding activities, places, and contacts.

Referring again to FIG. 1, the activity-based service provider 102 may include various means, such as a processor 110, memory 112, communication interface 114, user interface 116, and activity coordination unit 118 for performing the various functions herein described. These means of the activity-based service provider 102 as described herein may be embodied as, for example, hardware elements (e.g., a suitably programmed processor, combinational logic circuit, and/or the like), computer code (e.g., software or firmware) embodied on a computer-readable medium (e.g. memory 112) that is executable by a suitably configured processing device (e.g., the processor 110), or some combination thereof. The processor 110 may, for example, be embodied as various means including a microprocessor, a coprocessor, a controller, or various other processing elements including integrated circuits such as, for example, an ASIC (application specific integrated circuit) or FPGA (field programmable gate array). In an exemplary embodiment, the processor 110 may be configured to execute instructions stored in the memory 112 or otherwise accessible to the processor 110. Although illustrated in FIG. 1 as a single processor, the processor 110 may comprise a plurality of processors operating in parallel, such as a multi-processor system. Such multiple processors may be embodied in a single computing device or may be distributed across multiple computing devices, such as in a server cluster.

The memory 112 may include, for example, volatile and/or non-volatile memory. The memory 112 may be configured to store information, data, applications, instructions, or the like for enabling the activity-based service provider 102 to carry out various functions in accordance with exemplary embodiments of the present invention. For example, the memory 112 may be configured to buffer input data for processing by the processor 110. Additionally or alternatively, the memory 112 may be configured to store instructions for execution by the processor 110. The memory 112 may comprise one or more databases that store information in the form of static and/or dynamic information. In this regard, the memory 112 may store, for example, activities and associated information, places and associated information, user profiles, contacts, and/or the like, such as may be used in an activity-based service. This stored information may be stored and/or used by the activity coordination unit 118 during the course of performing its functionalities.

The communication interface 114 may be embodied as any device or means embodied in hardware, software, firmware, or a combination thereof that is configured to receive and/or transmit data from/to a network, such as the network 108, and/or any other device, such as a third party service provider 104 and/or client device 106, in communication with the activity-based service provider 102. In one embodiment, the communication interface 114 may be at least partially embodied as or otherwise controlled by the processor 110. The communication interface 114 may include, for example, an antenna, a transmitter, a receiver, a transceiver and/or supporting hardware or software for enabling communications with other entities of the system 100, such as a third party service provider 104 and/or client device 106 via the network 108. The communication interface 114 may be configured to receive and/or transmit data using any protocol that may be used for communications between the activity-based service provider 102 and other computing devices of the system 100, such as a third party service provider 104 and/or a client device 106, over the network 108. The communication interface 114 may additionally be in communication with the memory 112, user interface 116, and/or activity coordination unit 118, such as via a bus.

The user interface 116 may be in communication with the processor 110 to receive an indication of a user input and/or to provide an audible, visual, mechanical, or other output to the user. As such, the user interface 116 may include, for example, a keyboard, a mouse, a joystick, a display, a touch screen display, a microphone, a speaker, and/or other input/output mechanisms. However, in an exemplary embodiment wherein the activity-based service provider 102 is embodied as a server, elements of the user interface may be reduced or even eliminated. The user interface 116 may further be in communication with the memory 112, communication interface 116, and/or activity coordination unit 118, such as via a bus.

The activity coordination unit 118 may be embodied as various means, such as hardware, software, firmware, or some combination thereof and, in one embodiment, may be embodied as or otherwise controlled by the processor 110. In embodiments where the activity coordination unit 118 is embodied separately from the processor 110, the activity coordination unit 118 may be in communication with the processor 110. The activity coordination unit 118 may be configured to receive, process, and send data and information related to the provision of activity-based services as discussed above in conjunction with FIG. 3. In this regard, the activity coordination unit 118 may be configured to manage and store, such as in memory 112, activity coordination information. This activity coordination information may include, for example, activities, contacts, places, locations, and/or the like that a user of a client device 106 may utilize to schedule activities, coordinate activities, and/or view another user's activity itinerary and/or location. Accordingly, the activity coordination unit 118 may be configured to facilitate creation, access, and/or modification of activities, contacts, and/or places by users of an activity-based service.

Estimating Current Location

As discussed above, the activity coordination unit 118 may be configured to determine a user's location, such as through received location indications, which may comprise, for example, user activity information, sensory information and/or the like. However, in some embodiments, the activity coordination unit 118 may not be configured to constantly track a user's location and/or may otherwise not have access to a user's location at all times. In this regard, for example, a user may not update his location upon each arrival at a new location. The user may also not have scheduled activities that define a location for the user at all times. Sometimes, such as, for example, due to limited capabilities of a system or network through which a client device 106 is communicating with the activity-based service provider 102, limited hardware capabilities of certain embodiments of a client device 106 (e.g., embodiments lacking GPS capabilities), user privacy settings, and/or the like, it may not be possible for the activity coordination unit 118 to determine a user's current location through sensory means. Even if the activity coordination unit 118 may determine a user's current location through sensory means when current location information for the user is not available, it may not be desirable for the activity coordination unit 118 to do so, such as due to battery life and power conservation concerns in embodiments wherein the client device 106 is embodied as a mobile computing device. Thus, the activity coordination unit 118 may not always have access to a current location for a user. Accordingly, the activity coordination unit 118 may be configured to estimate a current location for a user as described below.

In this regard, the activity coordination unit 118 may be configured to maintain data describing a user's location timeline. This data may be stored in the memory 112. The user's location timeline represents a timeline of a plurality of locations at which the user has been previously located and at which the user is scheduled to be located. In this regard, the activity coordination unit 118 may determine the location data from activities which the user has created and/or is scheduled to participate in. Since an activity may have an associated time and location or place at which the activity is to occur, the activity coordination unit 118 may be configured to determine and/or otherwise maintain a location timeline for a user from user activity data. Additionally, the location timeline may comprise locations at which the activity coordination unit 118 has determined the user to be located, such as through sensory means as well as locations determined by the activity coordination unit 118 from location updates and/or or other location indications, such as may be received from a client device 106.

The activity coordination unit 118 may be configured to receive a request for a user's current location. The user's current location may be defined as the user's location at a current time, which may either be the time at which the activity coordination unit 118 receives the request or the time at which the activity coordination unit 118 estimates the user's current location. The request may originate from a client device 106. In this regard, a second user using a client device 106 may request a first user's current location, such as by, interacting with the activity-based service provider 102 via a viewing agent configured to utilize an activity-based service provided by the activity-based service provider 102. The request may be implicit or explicit. In this regard, the second user may, for example, use the viewing agent to browse to an activity information page for the first user, which may automatically generate a request for the first user's current location that may be received by the activity coordination unit 118. Alternatively, the second user may explicitly query through a user interface displayed in the viewing agent for the first user's current location information.

The viewing agent may be embodied, for example, as a web browser configured to receive data from and transmit data to the activity coordination unit 118. This data may comprise, for example, a web page, activity coordination information, current location requests, location data, filtering, and/or the like. In an alternative embodiment, the viewing agent may be embodied as a dedicated application (e.g., a standalone application, applet executed by a web browser, and/or the like) configured to provide a user interface for an activity-based service. In embodiments where the viewing agent is embodied as a dedicated application, the viewing agent may be embodied as any means, including, for example, hardware, software, firmware, or some combination thereof. Such a dedicated application may be embodied and executed on the client device 106. Alternatively, such a dedicated application may be embodied as a web application accessible by the client device 106. The web application may, for example, be embodied as a series of program instructions stored on the memory 112 and executed by the processor 110. In some embodiments, the viewing agent may be embodied as the activity coordination unit 118.

In response to receipt of a request for a user's current location, the activity coordination unit 118 may be configured to estimate the user's current location. Accordingly, the activity coordination unit 118 may retrieve, such as from memory 112, the user's location timeline. The activity coordination unit 118 may then determine whether the location timeline defines a current location for the user and, if so, may estimate the user's current location to be the defined current location. If the location timeline does not define a current location for the user, the activity coordination unit 118 may be configured to determine a "previous location" for the user and a "next location" for the user that are defined in the location timeline. In this regard, the previous location may define the last known location for the user prior to the current time (e.g., the previous location in the location timeline having an associated time closest to the current time). The next location may define the next known future location for the user (e.g., the next location at which the user is scheduled to be located). The activity coordination unit 118 may be configured to estimate the user's current location based at least in part upon the previous location and the next location.

In an exemplary embodiment, the activity coordination unit 118 may be configured to estimate the user's current location to be the one of the previous location and the future location determined to have an associated time closest to the current time. In this regard, assume that the user's location timeline comprises the following location information:
The Office
8:00 AM-11:30 AM
Corner Cafe
12:00 PM-1:30 PM
The City Club Dinner Meeting with Client
6:30 PM-8:00 PM
Movie Theater
9:00 PM-11:00 PM As may be seen, there is a 5 hour gap between 1:30 PM and 6:30 PM for which a location is not defined. Assuming that the activity coordination unit 118 receives a request for the user's current location at 5:30 PM, the activity coordination unit 118 may determine the previous location to be "Corner Cafe" (e.g., the previous location in the location timeline having an associated time closest in time to the current time) and may determine the next location to be "The City Club" (e.g., the next known future location). The activity coordination unit 118 may then determine which of the previous location and the next location has an associated time closest to the current time. In this regard, there is a 4 hour difference (5:30 PM-1:30 PM) between the current time and the latest time associated with the previous location. There is a 1 hour difference (6:30 PM-5:30 PM) between the earliest time associated with the next location and the current time. Accordingly, since the next location is closer in time to the current time than the previous location, the activity coordination unit 118 may estimate the user's current location to be "The City Club."

In some embodiments, the activity coordination unit 118 may be configured with a predefined error tolerance threshold. Additionally or alternatively, the received request for a user's current location may comprise an error tolerance threshold, such as may be defined by a user of a client device 106. In this regard, an error tolerance threshold may comprise a maximum time differential for which the activity coordination unit 118 may estimate a user's current location based at least in part upon which of the previous location and the next location known for the user has an associated time closest to the current time. For example, considering again the above example, assume that the error tolerance threshold is 1 hour. Thus, if the current time is more than 1 hour from a time associated with the previous location or the next location, the activity coordination unit 118 may be configured to determine that it may not estimate a current location for the user within the error tolerance threshold. Thus, if the activity coordination unit 118 were to receive a request for the user's current location at 3:30 PM with a defined error tolerance threshold of 1 hour, the activity coordination unit 118 may be configured to determine that it may not estimate a current location for the user.

In an exemplary embodiment, the activity coordination unit 118 may be configured to additionally estimate a user's current location based at least in part upon a mode of transportation used by the user to get from the previous location to the next location. As used herein, "mode of transportation" may comprise an automobile, airplane, boat, walking, public transit system, and/or the like. In this regard, the activity coordination unit 118 may additionally be configured to maintain data in the user's location timeline regarding modes of transportation used by a user to get between locations. Thus, a user may define activities to include information about a mode of transportation used to get to and/or depart from an activity location. Additionally an activity or location entry may inherently comprise information about a mode of transportation. For example, an activity may comprise the following information: 12:00 AM—Charlotte, N.C. airport departing on flight for Berlin, Germany. Accordingly, the activity coordination unit 118 may be configured to determine from the location timeline what, if any, mode of transportation is defined for the user to get from the previous location to the next location.

The activity coordination unit 118 may further be configured to determine based at least in part upon the determined mode of transportation a route between the previous location and the next location. For example, if the determined mode of transportation is an automobile or walking, the activity coordination unit 118 may be configured to retrieve data from a mapping service, such as may be provided by the third party service provider 104, and determine a route from the previous location to the next location. In another example, if the determined mode of transportation is a public transit system, the activity coordination unit 118 may be configured to access public transit information, such as from a third party service provider 104, about a public transit system in the area in which the previous location and/or next location are located to determine route information, station locations, public transit methods (e.g., rail, bus, subway, and/or the like), running times, and/or the like. The activity coordination unit 118 may then be configured to determine from the accessed public transit information a route using the public transit system to get from the previous location to the next location as well as estimated departure and arrival times.

The activity coordination unit 118 may be configured to estimate a user's current location based at least in part upon the current time, a time associated with the previous location, a time associated with the next location, the determined route, and/or the determined mode of transportation. In this regard, the activity coordination unit 118 may be configured to determine from the mode of transportation and the route an estimated time of travel between the previous location and next location. The activity coordination unit 118 may utilize this estimated time of travel to determine an estimated time of departure from the previous location (assuming that the location timeline does not comprise data defining a departure time, in which case this determination may not be necessary) so that the user may arrive at the next location on time. Accordingly, if the current time is prior to the estimated time of departure, the activity coordination unit 118 may be configured to estimate the user's current location to be the previous location. If the current time is following the estimated time of departure, but prior to the user's arrival time at the next location, the activity coordination unit 118 may be configured to estimate the user's current location to be "in route to the next location."

In an exemplary embodiment, the activity coordination unit 118 may be configured to estimate a user's current location along a determined route between the previous location and the next location based at least in part upon the determined mode of transportation. For example, the activity coordination unit 118 may receive a request for a user's current location at a current time that falls during the user's transit between the previous location and the next location. Accordingly, the activity coordination unit 118 may be configured, for example, to determine a time elapsed from the user's time of departure to the current time may use the elapsed time and an estimated average speed along the determined route for the determined mode of transportation to estimate the user's current location along the route. Thus, for example, using the previous example location timeline, assume that the user had defined the mode of transportation to get from The Office to the Corner Cafe to be walking with a departure time from The Office of 11:30 AM. Assume that the user's current location is requested at 11:40 AM. The activity coordination unit 118 may determine from mapping data a route between The Office and the Corner Cafe and may estimate a location at which the user would be on the route after 10 minutes of walking.

Accordingly, the activity coordination unit 118 may be configured to use mode of transportation information to determine a more accurate estimated current location for a user. Although certain examples of use of mode of transportation to estimate a current location have been provided herein, embodiments of the present invention are not limited to estimating a current location in accordance with the examples provided herein and thus it will be appreciated that the activity coordination unit 118 may be configured to utilize mode of transportation and/or route information to estimate a current location for a user utilizing other estimation methods.

Once the activity coordination unit 118 has estimated a user's current location, the activity coordination unit 118 may be configured to provide the current location to the requesting user. In this regard, providing the current location to the requesting user may comprise sending the current location data to a client device 106 used by the user. The activity coordination unit 118 may send the current location data in an electronic message (e.g., text message, e-mail, instant message, and/or the like). In an exemplary embodiment, the activity coordination unit 118 may be configured to cause the current location data to be displayed in a viewing agent on the client device, such as on a web page. As used herein, language referring to the activity coordination unit 118 "causing" data such as, for example, a current location of a user, to be displayed refers to embodiments in which the activity coordination unit 118 actively instructs the viewing agent to display the data as well as to embodiments in which the activity coordination unit 118 sends data to a client device 106 such that a viewing agent may render data based at least in part upon the sent data. Accordingly, data which the activity coordination unit 118 causes to be displayed may be displayed in a viewing agent on a display device, such as a monitor, display screen, and/or the like, which may be embodied on or operatively coupled to the client device 106. In one embodiment, the activity coordination unit 118 may be configured to cause the estimated current location to be displayed in the viewing agent on a map such that the position of the current location is displayed on the map.

In some embodiments, the activity coordination unit 118 may be configured to receive a request for a user's current location from a third party service provider 104 and provide the current location to the third party service provider 104. In this regard, for example, a social networking service or other service offered by the third party service provider 104 may utilize the current location information for the user to enhance the offered service. In some embodiments, the activity coordination unit 118 may be configured to periodically estimate a user's current location and provide the current location to the third party service provider 104. In this regard, there may be an established understanding between the activity-based service provider 102 and the third party service provider 104 that the activity-based service provider 102 will provide estimated current location information at, for example, regular intervals.

Suggestion of Relevant Activity Coordination Information

In an exemplary embodiment, the activity coordination unit 118 may be configured to suggest relevant activity coordination information to a user. In this regard, the viewing agent may comprise a query interface and/or the activity coordination unit 118 may be configured to cause a query interface to be displayed in the viewing agent. A user of a client device 106 may be able to use the query interface to search for relevant activities, places, and/or contacts to obtain information that the user may utilize for activity planning and coordination purposes. A user may start to type in a portion of a contact, place, and/or activity name into the query interface and the activity coordination unit 118 may be configured to receive the portion and determine contact(s), place(s), and/or activities matching the portion and cause the suggested matching contacts, places, and/or activities to be displayed in the query interface. In this regard, the activity coordination unit 118 may provide for automatic completion of text fields.

In an exemplary embodiment, the activity coordination unit 118 may be configured to receive a contact name and/or an identifiable portion thereof over the query interface and determine places to which that contact has been. In this regard, the activity coordination unit 118 may be configured to look up the received contact name in memory 112 to retrieve stored activity information for the contact, including, for example, the activities in which the contact has participated, activities in which the contact is scheduled to participate, a location timeline for the contact, and/or the like. The activity coordination unit 118 may then determine one or more places associated with the retrieved activity information (e.g. places at which activities in which the user has participated have occurred). These determined places may represent places to which the contact has been and/or places to which the contact is scheduled to go. The activity coordination unit 118 may then cause the determined places to be displayed in the viewing agent as suggested results in response to the received query. Additionally or alternatively, the activity coordination unit 118 may be similarly configured to receive a place name and/or an identifiable portion thereof and determine one or more contacts who have been to the place and/or are scheduled to be at the place in the future. The activity coordination unit 118 may then be configured to cause the determined contacts to be displayed in the viewing agent as suggested results in response to the received query.

Such embodiments may be useful, for example, if a user does not remember a name of a place, but remembers a name of a contact that has been to the place. Thus, the user may not be able to query the activity-based service provider 102 for information directly about the place, but may indirectly query by searching for the contact's name. In another example, if a user is planning to visit a place and knows that a contact is also going to the place, but cannot remember the name of the contact, the user may search indirectly for the contact by querying for information about the place. This may be helpful, for example, if the user wishes to coordinate an activity at the place with the contact who is going to the place.

Management of Privacy Settings and Access to Information

In an exemplary embodiment, the activity coordination unit 118 may be configured to allow users of activity-based services to control what information about the user may be accessed by contacts. The activity coordination unit 118 may be configured to provide privacy management on a contact-by-contact basis and/or on a group basis such that a user may define what information may be accessed by each contact or group of contacts as well as a degree of access (if applicable). For example, a user may define certain information to be private such that it may only be accessed by the user, e.g., the owner of the information. In another example, a user may define certain information to be visible only to known contacts (e.g., contacts that may be in a contacts list of the user, contacts with which the user has established a bi-directional friendship relationship in a social networking context, and/or the like). In still another example, a user may define certain information to be visible only to certain contacts explicitly given permission to access the information by the user. For example, in embodiments in which the activity coordination unit 118 is configured to estimate a current location for a user, the user may wish to define what contacts or groups of contacts may access the user's current location.

Accordingly, each time a user of a client device 106 accesses an activity-based service provided by the activity-based service provider 102, the activity coordination unit 102 may be configured to start a user session that defines the accessing user. The user session may uniquely identify the user. Access rights definitions (e.g. definitions defined by a user owning the information as described above) may be stored in association with each piece of information, such as an activity, place, contact, and/or the like stored in the memory 112. In this regard, each piece of information may be stored in the memory 112 as a record in a database. Accordingly, when a user having an active user session attempts to access a stored record, the activity coordination unit 118 may be configured to determine based at least in part upon the user session and the access rights definitions associated with the record whether the user has rights to access the record and/or an extent of the access rights (e.g, right to view only, right to modify, and/or the like). The activity coordination unit 118 may then be configured to provide or deny access to the record in accordance with the access rights accorded to the user.

Such an embodiment may be advantageous in that access rights may be managed within database views transparent to the application level. Thus access rules may be modified at a database level without modifying application level logic (e.g., logic of the viewing agent or activity coordination unit 118).

Figure 4:
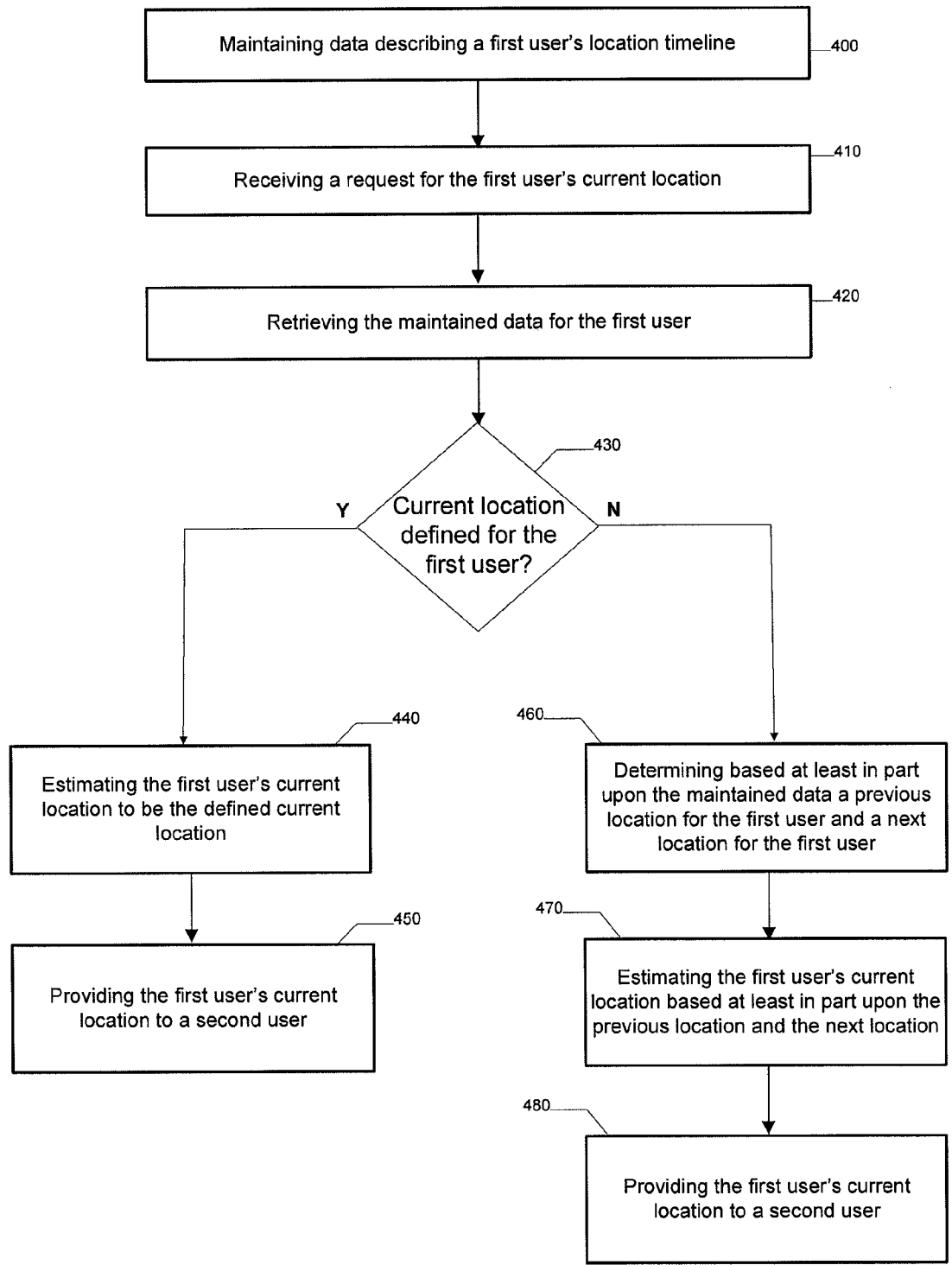
FIG. 4 is a flowchart according to an exemplary method for providing user location information according to an exemplary embodiment of the present invention.

Referring now to FIG. 4, FIG. 4 is a flowchart of a system, method, and computer program product according to exemplary embodiments of the invention. It will be understood that each block or step of the flowchart, and combinations of blocks in the flowchart, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal, server, or other computing device and executed by a processor in the computing device. In some embodiments, the computer program instructions which embody the procedures described above may be stored by memory devices of a plurality of computing devices. As will be appreciated, any such computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, may be implemented by special purpose hardware-based computer systems which perform the specified functions or steps, or combinations of special purpose hardware and computer instructions.

In this regard, one exemplary method for providing user location information according to an exemplary embodiment of the present invention is illustrated in FIG. 4. The method may include the activity coordination unit 118 maintaining data describing a first user's location timeline, at operation 400. Operation 410 may comprise the activity coordination unit 118 receiving a request for the first user's current location. The first user's current location may define the first user's location at a current time. The activity coordination unit 118 may then retrieve the maintained data, at operation 420. Operation 430 may comprise the activity coordination unit 118 determining based at least in part upon the maintained data whether the location timeline defines a current location for the first user.

If a current location is defined for the first user, the activity coordination unit 118 may then estimate the first user's current location to be the defined location, at operation 440. The activity coordination unit 118 may then provide the first user's current location to a second user, at operation 450. In this regard, for example, the activity coordination unit 118 may provide the first user's current location to a client device 106 from which the second user may have requested the first user's current location.

If, on the other hand, the activity coordination unit 118 determines at operation 430 that a current location is not defined for the user, the activity coordination unit 118 may determine based at least in part upon the maintained data a previous location for the first user and a next location for the first user, at operation 460. The previous location may define a known previous location for the first user having an associated time closest in time to the current time (e.g., a last known location for the user). The next location may define a next known future location for the first user. Operation 470 may comprise the activity coordination unit 118 estimating the first user's current location based at least in part upon the previous location and the next location. The activity coordination unit 118 may then provide the first user's current location to a second user, at operation 480.

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention may provide several advantages to a user of a computing device, such as a mobile terminal 10. Embodiments of the invention may provide for estimation of a current location of a user. In this regard, embodiments of the invention may provide current location information for a user to other users. This current location information may provide information about a user's current whereabouts that may be used, for example, for activity coordination and planning by other users. Additionally or alternatively, the current location information may be utilized by social networking services and/or for other activity-based services that may be provided by an activity-based service provider. Embodiments of the present invention may also provide for management of privacy settings such that users may control who may access their information as well as an extent of such access.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   maintaining data describing a first user's location timeline, wherein the location timeline comprises a location at which the first user will be located in the future;
   receiving a request for the first user's current location;
   estimating, by a processor, the first user's current location based at least in part upon the maintained data; and
   causing the first user's current location to be provided;
   wherein the first user's current location defines the first user's location at a current time, and wherein estimating the first user's current location comprises:
   determining, based at least in part upon the maintained data, a previous location for the first user and a next location for the first user, wherein the previous location is that associated with a known location previous to the time of the request, and wherein the next location defines the next known future location for the first user relative to the time of the request;
   estimating the first user's current location based at least in part upon the previous location and the next location, and
   wherein estimating the first user's current location based at least in part upon the previous location and the next location comprises estimating the first user's current location to be one of the previous location and the next location based at least in part upon a determination of which of the previous location and the next location has an associated time closest to the time of the request, wherein the time of the request is between the time associated with the previous location and the time associated with the next location.

2. A method according to claim 1, further comprising:
   determining based at least in part upon the maintained data a mode of transportation for the first user between the previous location and the next location; and
   determining a route between the previous location and the next location based at least in part upon the determined mode of transportation; and
   wherein estimating the first user's current location based at least in part upon the previous location and the next location comprises estimating the first user's current location based at least in part upon the determined mode of transportation, determined route, current time, the time associated with the previous location, and the time associated with the next location.

3. A method according to claim 2, wherein the mode of transportation is one or more of automobile, airplane, boat, walking, or public transit system.

4. A method according to claim 1, wherein the current time comprises a time at which the request is received or a time at which the first user's location is estimated.

5. A method according to claim 1, wherein estimating the first user's current location further comprises determining based at least in part upon the maintained data whether a current location is defined for the first user and, if so, estimating the first user's current location to be the defined current location.

6. A method according to claim 1, wherein causing the first user's current location to be provided comprises causing the first user's current location to be displayed on a map.

7. A method according to claim 1, wherein maintaining data describing a first user's location timeline further comprises causing the data in a memory to be stored.

8. A computer program product comprising at least one non-transitory computer-readable storage medium having computer-readable program instructions stored therein, the computer-readable program instructions configured to cause a processor to execute the steps:
   maintaining data describing a first user's location timeline, wherein the location timeline comprises a location at which the first user will be located in the future;
   receiving a request for the first user's current location;
   estimating, by a processor, the first user's current location based at least in part upon the maintained data; and
   causing the first user's current location to be provided;
   wherein the first user's current location defines the first user's location at a current time, and wherein estimating the first user's current location comprises:
   determining, based at least in part upon the maintained data, a previous location for the first user and a next location for the first user, wherein the previous location is that associated with a known location previous to the time of the request, and wherein the next location defines the next known future location for the first user relative to the time of the request;
   estimating the first user's current location based at least in part upon the previous location and the next location, and
   wherein estimating the first user's current location based at least in part upon the previous location and the next location comprises estimating the first user's current location to be one of the previous location and the next location based at least in part upon a determination of which of the previous location and the next location has an associated time closest to the time of the request, wherein the time of the request is between the time associated with the previous location and the time associated with the next location.

9. A computer program product according to claim 8, further comprising program instructions configured to cause a processor to execute the steps:
- determining based at least in part upon the maintained data a mode of transportation for the first user between the previous location and the next location; and
- determining a route between the previous location and the next location based at least in part upon the determined mode of transportation; and
- wherein estimating the first user's current location based at least in part upon the previous location and the next location comprises estimating the first user's current location based at least in part upon the determined mode of transportation, determined route, current time, the time associated with the previous location, and the time associated with the next location.

10. A computer program product according to claim 9, wherein the mode of transportation is one or more of automobile, airplane, boat, walking, or public transit system.

11. A computer program product according to claim 8, wherein the current time comprises a time at which the request is received or a time at which the first user's location is estimated.

12. A computer program product according to claim 8, wherein the program instructions configured to cause a processor to estimate location includes instructions for determining based at least in part upon the maintained data whether a current location is defined for the first user and, if so, estimating the first user's current location to be the defined current location.

13. A computer program product according to claim 8, wherein the program instructions configured to cause the first user's current location to be provided includes instructions for causing the first user's current location to be displayed on a map.

14. An apparatus comprising:
- at least one processor and at least one memory including computer program code, wherein the at least one memory and the computer program code are configured to, with the at least one processor, cause the apparatus to at least:
- maintain data describing a first user's location timeline, wherein the location timeline comprises a location at which the first user will be located in the future;
- receive a request for the first user's current location;
- estimate the first user's current location based at least in part upon the maintained data; and
- cause the first user's current location to be provided,
- wherein the first user's current location defines the first user's location at a current time, and wherein the at least one memory and the computer program code are configured to, with the at least one processor, cause the apparatus to estimate the first user's current location by:
- determining, based at least in part upon the maintained data, a previous location for the first user and a next location for the first user, wherein the previous location is that associated with a known location previous to the time of the request, and wherein the next location defines the next known future location for the first user relative to the time of the request; and
- estimating the first user's current location based at least in part upon the previous location and the next location, and
- wherein estimating the first user's current location based at least in part upon the previous location and the next location comprises estimating the first user's current location to be one of the previous location and the next location based at least in part upon a determination of which of the previous location and the next location has an associated time closest to the time of the request, wherein the time of the request is between the time associated with the previous location and the time associated with the next location.

15. An apparatus according to claim 14, wherein the at least one memory and the computer program code are configured to, with the at least one processor, further cause the apparatus to:
- determine based at least in part upon the maintained data a mode of transportation for the first user between the previous location and the next location; and
- determine a route between the previous location and the next location based at least in part upon the determined mode of transportation; and
- wherein the at least one memory and the computer program code are configured to, with the at least one processor, further cause the apparatus to estimate the first user's current location based at least in part upon the previous location and the next location at least in part by estimating the first user's current location based at least in part upon the determined mode of transportation, determined route, current time, the time associated with the previous location, and the time associated with the next location.

16. An apparatus according to claim 15, wherein the mode of transportation is one or more of automobile, airplane, boat, walking, or public transit system.

17. An apparatus according to claim 14, wherein the current time comprises a time at which the request is received or a time at which the first user's location is estimated.

18. An apparatus according to claim 14, wherein the at least one memory and the computer program code are configured to, with the at least one processor, further cause the apparatus to estimate the first user's current location at least in part by determining based at least in part upon the maintained data whether a current location is defined for the first user and, if so, estimating the first user's current location to be the defined current location.

19. An apparatus according to claim 14, wherein the at least one memory and the computer program code are configured to, with the at least one processor, further cause the apparatus to cause the first user's location to be provided at least in part by causing the first user's current location to be displayed on a map.

20. An apparatus according to claim 14, wherein the at least one memory and the computer program code are configured to, with the at least one processor, further cause the apparatus to store the maintained data in a memory.

* * * * *